(12) United States Patent
Stephens et al.

(10) Patent No.: US 9,255,993 B2
(45) Date of Patent: Feb. 9, 2016

(54) PROCESSING SATELLITE DATA FOR SLANT TOTAL ELECTRON CONTENT MEASUREMENTS

(71) Applicant: California Institute of Technology, Pasadena, CA (US)

(72) Inventors: Philip John Stephens, Thousand Oaks, CA (US); Attila Komjathy, La Crescenta, CA (US); Brian D. Wilson, Altadena, CA (US); Anthony J. Mannucci, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 431 days.

(21) Appl. No.: 13/763,196

(22) Filed: Feb. 8, 2013

(65) Prior Publication Data

US 2013/0201058 A1 Aug. 8, 2013

Related U.S. Application Data

(60) Provisional application No. 61/596,406, filed on Feb. 8, 2012.

(51) Int. Cl.
*G01S 19/07* (2010.01)
*G01S 19/03* (2010.01)
*G01S 19/21* (2010.01)
*G01S 19/14* (2010.01)

(52) U.S. Cl.
CPC *G01S 19/21* (2013.01); *G01S 19/14* (2013.01)

(58) Field of Classification Search
USPC .............. 342/357.4, 357.44, 357.46, 357.59; 701/467, 468
See application file for complete search history.

(56) References Cited

U.S. PATENT DOCUMENTS

| 5,828,336 | A | * | 10/1998 | Yunck et al. ............. 342/357.31 |
| 2006/0017610 | A1 | | 1/2006 | Komjathy et al. |
| 2006/0164297 | A1 | | 7/2006 | Hernandez-Pajares et al. |
| 2009/0224969 | A1 | | 9/2009 | Kolb |
| 2010/0013645 | A1 | * | 1/2010 | Meier et al. ................... 340/601 |
| 2011/0140958 | A1 | | 6/2011 | Henkel et al. |

FOREIGN PATENT DOCUMENTS

WO 2006108227 10/2006

OTHER PUBLICATIONS

Bilitza, D., et al., "International Reference Ionosphere 2007: Improvements and new parameters", Advances in Space Research, 42, 2008, 599-609.
Estey, Louis H., et al., "TEQC: The Multi-Purpose Toolkit for GPS/GLONASS Data", GPS Solutions, vol. 3, No. 1, pp. 42-49, 1999.
(Continued)

*Primary Examiner* — Dao Phan
(74) *Attorney, Agent, or Firm* — Gates & Cooper LLP

(57) ABSTRACT

A method, system, and apparatus provide the ability to estimate ionospheric observables using space-borne observations. Space-borne global positioning system (GPS) data of ionospheric delay are obtained from a satellite. The space-borne GPS data are combined with ground-based GPS observations. The combination is utilized in a model to estimate a global three-dimensional (3D) electron density field.

16 Claims, 8 Drawing Sheets

(56) References Cited

OTHER PUBLICATIONS

Hajj, George A., et al., "Ionospheric electron density profiles obtained with the Global Positioning System: Results from the GPS/MET experiment", Radio Science, vol. 33, No. 1, pp. 175-190, Jan.-Feb. 1998.

Hajj, G. A., et al., "Data assimilation of ground GPS total electron content into a physics-based ionospheric model by use of the Kalman filter", Radio Science, vol. 39, RS1S05, 2004.

Hernandez-Pajares, M., et al., "The IGS VTEC maps: a reliable source of ionospheric information since 1998", Journal of Geodesy (2009), 83:263-275.

Hwang, Cheinway, et al., "Quality assessment of FORMOSAT-3/COSMIC and GRACE GPS observables: analysis of multipath, ionospheric delay and phase residual in orbit determination", GPS Solutions, 14:121-131, 2010.

Jakowski, N., et al., "Space weather monitoring by GPS measurements on board CHAMP", Space Weather, (2007), vol. 5 (S08006).

Komjathy, A., et al., "JPL/USC GAIM: On the impact of using COSMIC and ground-based GPS measurements to estimate ionospheric parameters", Journal Geophysical Research, vol. 115, A02307, 2010.

Mandrake, L., et al., A performance evaluation of the operational Jet Propulsion Laboratory/University of Southern California Global Assimilation Ionospheric Model (JPL/USC GAIM), Journal Geophysical Research, vol. 110, A12306, 2005.

Mannucci, A. J., et al., "A global mapping technique for GPS-derived ionospheric total electron content measurements", Radio Science, vol. 33, No. 3, pp. 565-582, May-Jun. 1998.

Pi, Xiaoqing, et al., "Assimilative Modeling of Ionospheric Disturbances with FORMOSAT-3/COSMIC and ground-based GPS Measurements", Terr., Atmos., and Ocean. Sci., 20 (I), (2009), 273-285.

Sheeley, B. W., et al., "An empirical plasmasphere and trough density model: CRRES observations", Journal of Geophysical Research, vol. 106, No. A11, 25,631-25,641, Nov. 1, 2001.

Syndergaard, Stig, et al. "A Refractive Index Mapping Operator for Assimilation of Occultation Data", American Meteorological Society, Monthly Weather Review, vol. 133(9), pp. 2650-2668, 2005.

Tu, Jiannan., et al., "Empirical specification of field-aligned plasma density profiles for plasmasphere refilling", Journal of Geophysical Research (Space Physics), vol. 111, A06216, 2006.

Yizengaw, E., et al., "Global plasmaspheric TEC and its relative contribution to GPS TEC", Journal of Atmospheric and Solar-Terrestrial Physics, 70, 1541-1548, 2008.

Occultations—definition of Occultations by the Free Online Dictionary, (The American Heritage Dictionary of the English Language, 4th Edition copyright 2000 by Houghton Mifflin Company. Updated in 2009. Published by Houghton Mifflin Company.) http://www.thefreedictionary.com/Occultations.

COSMIC : About Us, "FORMOSAT-3/COSMIC Overview", UCAR Community Programs, last modified Jan. 29, 2013. http://www.cosmic.ucar.edu/about.html.

"Radio occultation", Wikipedia, the free encyclopedia, Planetary science, Physics stubs, last modified on Aug. 29, 2012. http://en.wikipedia.org/wiki/Radio_occultation.

"Ionosphere", Wikipedia, the free encyclopedia, Radio frequency propagation, Atmosphere, Space plasmas, Plasma physics, last modified Jan. 28, 2013. http://en.wikipedia.org/wiki/Ionosphere.

Blanch, J., "An Ionosphere Estimation Algorithm for WAAS Based on Kriging", Proceedings of the 15th International Technical Meeting of the Satellite Division of the Institute of Navigation (ION GPS 2002), Portland, OR, Sep. 24-27, 2002, pp. 816-823.

Paredes, E., et al., "Reconstructing the WAAS Undersampled Ionospheric Gradient Threat Model for the WAAS Expansion into Mexico," in Proceedings of the 21st International Technical Meeting of the Satellite Division of The Institute of Navigation (ION GNSS 2008), Savannah, GA, Sep. 2008, pp. 1938-1947.

Sparks, L., et al., "The WAAS Ionospheric Threat Model," Proc. of the International Beacon Satellite Symposium 2001, Boston, MA, Jun. 2001, 5 pages.

Sparks, L., et al., "Sudden Ionospheric Delay Decorrelation and Its Impact on the Wide Area Augmentation System (WAAS)", Radio Sci., 39, RS1S13, 2004, 13 pages. doi:10.1029/2002RS002845.

Sparks, L., et al., "Extreme Ionospheric Storms and Their Impact on WAAS", Proc. of the 11th International Ionospheric Effects Symposium 2005 (IES 2005), Alexandria, VA, May 2005, pp. 1-9. http://hdl.handle.net/2014/37807.

Sparks, L., et al., "Kriging as a Means of Improving WAAS Availability", Proceedings of the 23rd International Technical Meeting of the Satellite Division of the Institute of Navigation (ION GNSS 2010), Portland, OR, Sep. 21-24, 2010, pp. 2013-2020.

Sparks, L., et al., "Estimating ionospheric delay using kriging: 1. Methodology", Radio Science—Washington—, 46, 6, 2011, RS0D21, 35 pages. doi:10.1029/2011RS004667.

Sparks, L., et al., "Estimating ionospheric delay using kriging: 2. Impact on satellite-based augmentation system availability", Radio Science, vol. 46, Issue 6, Dec. 2011, RS0D22, 28 pages. doi:10.1029/2011RS004781.

Walter, T., et al., "Robust Detection of Ionospheric Irregularities", Navigation, Journal of the Institute of Navigation, vol. 48, No. 2, Summer 2001, pp. 89-100.

"Algorithm Description Document for the Grid Ionospheric Vertical Error (GIVE) Monitor of the Wide Area Augmentation System", CDRL Sequence No. A014-006H, prepared for the Federal Aviation Administration by the Raytheon Company, Jul. 14, 2010.

Altshuler, E. S., et al., "The WAAS Ionospheric Spatial Threat Model," Proc. of ION GPS 2001, Institute of Navigation, Salt Lake City, UT, Sep. 11-14, 2001.

Blanch, J. (2002), An Ionosphere Estimation Algorithm for WAAS Based on Kriging, Proceedings of the 15th International Technical Meeting of the Satellite Division of the Institute of Navigation (ION GPS 2002), Portland, OR, 816-823.

Blanch, J. (2003), Using Kriging to Bound Satellite Ranging Errors Due to the Ionosphere, Ph.D. thesis, Stanford University, Stanford, California (available online at waas.stanford.edu).

Komjathy, A., et al., (2005), The ionospheric impact of the Oct. 2003 storm event on Wide Area Augmentation System, GPS Solutions, 9: 41-50, doi:10.1007/s10291-004-0126-2.

Paredes, E., et al., "Reconstructing the WAAS Undersampled Ionospheric Gradient Threat Model for the WAAS Expansion into Mexico," in Proc. of ION GNSS 2008, Institute of Navigation, Savannah, GA, Sep. 2008.

Sparks, L., et al., "The WAAS Ionospheric Threat Model," Proc. of the International Beacon Satellite Symposium 2001, Boston, MA, Jun. 2001.

Sparks, L., et al., "Sudden Ionospheric Delay Decorrelation and Its Impact on the Wide Area Augmentation System (WAAS)" Radio Sci., 39, RS1S13, doi:10.1029/2002RS002845, 2004.

Sparks, L. A., et al., "SBAS Estimation of Ionospheric Delay in the Presence of a Highly Structured Ionosphere," Proceedings of the Beacon Satellite Symposium 2004, Trieste, Italy, Oct. 2004.

Sparks, L., et al., "Extreme Ionospheric Storms and Their Impact on WAAS," Proc. of the 11th International Ionospheric Effects Symposium 2005 (IES 2005), Alexandria, VA, May 2005.

Sparks, L., et al., "Estimating Ionospheric Slant Delay without Resorting to the Thin-Shell Approximation", JPL, Position Location and Navigation Symposium 2006, San Diego, CA, Apr. 25, 2006.

Sparks, L., et al., "Validation of the Computation of the WAAS Ionospheric Threat Model—Final Report on the Intercode Comparison for Release 8/9", delivered to the WAAS Integrity and Performance Panel (WIPP), Oct. 1, 2008.

Sparks, L. A., et al., "Conical-Domain Model for Estimating GPS Ionospheric Delays," Software Tech Briefs, Supplement to NASA Tech Briefs, Sep. 4, 2009A.

Sparks, L. A., et al., "Multi-Cone Model for Estimating GPS Ionospheric Delays," NASA Tech Briefs, Oct. 1, 2009B.

Sparks, L., et al., "Validation of the Computation of the WFO Release 3 Ionospheric Threat Model—Report on the Intercode Comparison", delivered to the WAAS Integrity and Performance Panel (WIPP), Apr. 30, 2010.

(56) References Cited

OTHER PUBLICATIONS

Sparks, L., et al. (2010a), Estimation of Ionospheric Delay Using Kriging and its Impact on WAAS Availability, Proceedings of the International Beacon Satellite Symposium 2010, Technical University of Catalonia, Barcelona, Spain.

Sparks, L., et al. (2010b), Kriging as a Means of Improving WAAS Availability, Proceedings of the 23rd International Technical Meeting of the Satellite Division of the Institute of Navigation (ION GNSS 2010), Portland, OR, 2013-2020.

Sparks, L., et al., "Estimating ionospheric delay using kriging: 1. Methodology," Radio Sci., 46, RS0D21, doi:10.1029/2011RS004667, 2011A.

Sparks, L., et al., "Estimating ionospheric delay using kriging: 2. Impact on satellite-based augmentation system availability," Radio Sci., 46, RS0D22, doi:10.1029/2011RS004781, 2011B.

Sparks, L. (2013), Ionospheric Slant TEC Analysis Using GNSS-based Estimation (IonoSTAGE), JPL-D 34117, Jet Propulsion Laboratory, Pasadena, CA.

Walter, T., et al., (2000), Robust Detection of Ionospheric Irregularities, Navigation 48, 89-100.

Zumberge, J. F., et al., (1997), Precise point positioning for the efficient and robust analysis of GPS data from large networks, J. Geophys. Res., 102 (B3), 5005-5017.

PCT International Search Report and Written Opinion dated Dec. 9, 2013 for PCT Application No. PCT/US2013/049953.

\* cited by examiner

PROCESSING SATELLITE DATA FOR SLANT TOTAL ELECTRON CONTENT MEASUREMENTS

CROSS-REFERENCE TO RELATED APPLICATIONS

This application claims the benefit under 35 U.S.C. Section 119(e) of the following co-pending and commonly-assigned U.S. provisional patent application(s), which is/are incorporated by reference herein:

Provisional Application Ser. No. 61/596,406, filed on Feb. 8, 2012, by Philip Stephens, Attila Komjathy, Brian D. Wilson, and Anthony J. Mannucci, entitled "Processing COSMIC/FORMOSAT-3 Data for Slant Total Electron Content Measurements".

STATEMENT REGARDING FEDERALLY SPONSORED RESEARCH AND DEVELOPMENT

The invention described herein was made in the performance of work under a NASA contract, and is subject to the provisions of Public Law 96-517 (35 USC 202) in which the Contractor has elected to retain title.

BACKGROUND OF THE INVENTION

1. Field of the Invention

The present invention relates generally to ionospheric modeling, and in particular, to a method, apparatus, and article of manufacture for including ionospheric radio occultation data between satellites and global positioning system (GPS) transmitters to improve ionospheric modeling.

2. Description of the Related Art (Note: This application references a number of different publications as indicated throughout the specification by names and years of publications (e.g., Author [2006]). A list of these different publications ordered according to these references can be found below in the section entitled "References." Each of these publications is incorporated by reference herein.)

Ionospheric remote sensing is in a rapid growth phase driven by an abundance of ground and space-based GPS receivers, new UV (ultraviolet) remote sensing satellites, and the advent of data assimilation techniques for space weather. The success of the GPS/MET (Global Positioning System/Meterology) experiment in 1995 inspired a number of follow-on radio occultation missions for profiling the atmosphere and ionosphere. These include the Argentine Satelite de Aplicanciones Cientificas-C (SAC-C), the U.S.-funded Ionospheric Occultation Experiment (IOX), and Germany's Challenging Minisatellite Payload (CHAMP) (Jakowski and Wilken [2006]). The joint U.S./Taiwan Constellation Observing System for Meteorology, Ionosphere and Climate (COSMIC—http://cosmicio.cosmic.ucar.edu/cdaac/index.html), a new constellation of six satellites, nominally provides up to 3000 ionospheric occultations per day. The COSMIC; 6-satellite constellation was launched in April 2006 and observed final orbits in November, 2007. COSMIC now provides an unprecedented global coverage of GPS occultation measurements (between 1400 and 2400 good soundings per day as of June 2009), each of which yields electron density information with 1 km vertical resolution. Calibrated measurements of ionospheric delay (total electron content or TEC) suitable for input into assimilation models are currently made available in near real-time (NRT) from COSMIC with a latency of 30 to 120 minutes. Similarly, NRT TEC data are available from two worldwide NRT networks of ground GPS receivers (75 5-minute sites and 125 hourly sites, operated by JPL [Jet Proplultion Laboratory] and others).

The combined ground and space-based GPS datasets provide new opportunities to more accurately specify the 3-dimensional ionospheric density with a time lag of only 15 to 120 minutes. With the addition of the vertically-resolved occultation data, the retrieved profile shapes represent the hour-to-hour ionospheric weather much more accurately (Komjathy et al. [2010]). The process has begun where COSMIC-derived TEC measurements are integrated with ground-based GPS TEC data and such data is assimilated into models such as the JPL/USC Global Assimilative Ionospheric Model (GAIM) (Hajj et al. [2004]; Hajj and Romans [1998]; Mandrake et al. [2005]) so that three-dimensional global electron density structures and ionospheric drivers can be estimated. Recently the COSMIC GPS measurements along with ground-based GPS measurements have been assimilated into JPL/USC GAIM for a study of ionospheric storm (Pi et al. [2009]) revealing distinguished features of equatorial anomaly enhancements.

Over the course of the past 15 years, the Global Ionospheric Mapping (GIM) software developed at the Jet Propulsion Laboratory (Mannucci et al. [1998]) has been used to compute high precision slant ionospheric delay by removing the satellite and receiver differential biases from ionospheric observables using ground-based GPS receivers.

In view of the above, what is needed is a method to estimate ionospheric observables that can be used (e.g., in combination with other systems) to estimate a global 3D electron density field.

SUMMARY OF THE INVENTION

Ionospheric modeling can be improved by the inclusion of occultation data between satellites and GPS transmitters. COSMIC/FORMOSTAT-3 provides a large dataset of such occultations. In order to utilize these absolute measurements in an assimilative model, the data must be carefully processed; the level of the ionospheric combination and the differential biases must be must be accurately determined. The COSMIC GPS receivers operate in a high multipath environment; a phase leveling algorithm, utilizing the information in the multipath, improves the leveling errors by at least 0.4 TECU.

Receiver biases are then computed from the leveled data by making some simplifying assumptions about the structure of the ionosphere and plasmasphere. Such processing provides occultation measurements as slant total electron content to an accuracy of 2.1 TECU (total electron content unit).

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1:
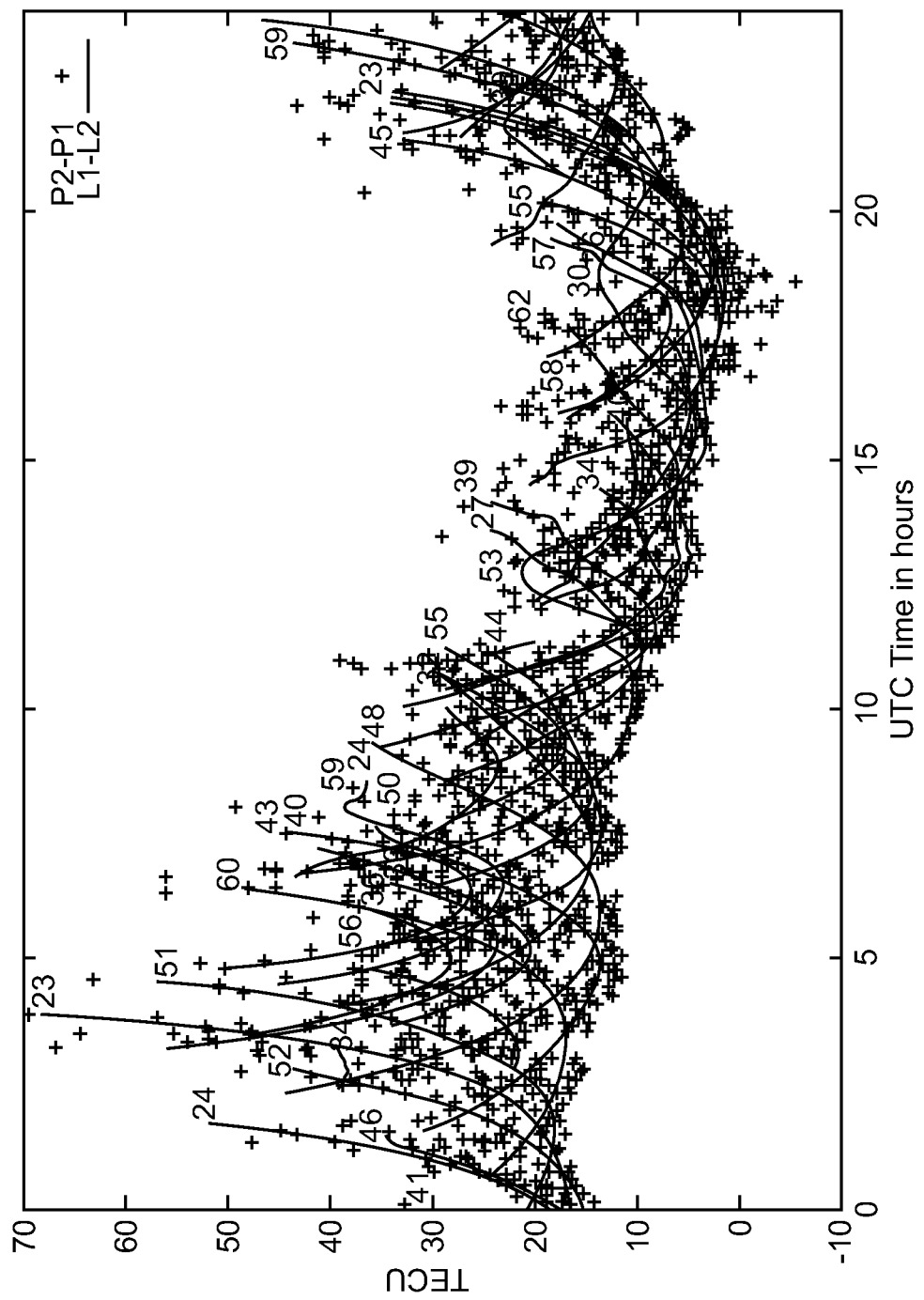
FIG. 1 illustrates an example of a PI combination versus a (leveled) LI combination for many arcs of data for a site in Australia on Nov. 16, 2010 in accordance with one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention describe a new and improved methodology to estimate GPS ionospheric observables using space-borne observations from COSMIC satellites. These high-precision space-borne GPS observations can be combined with ground-based GPS observations to serve as a backbone to Global Assimilative Ionospheric Model that estimates the global 3-D electron density field.

Extracting Slant TEC from GPS Observations

Dual-frequency GPS observations consist of pseudorange and carrier phase measurements, at the two GPS frequencies $f_1=1.5754$ GHz and $f_2=1.2276$ GHz. The corresponding pseudoranges, $P_1$ and $P_2$ are given by $$P_1 = \rho + c(dT-dt) + d_{ion,L_1} + d_{trop} + b^{s_i,P_1} + b_{r_j,P_1} + mp_{P_1} + \epsilon_{P_1},$$

$$P_2 = \rho + c(dT-dt) + \gamma d_{ion,L_1} + d_{trop} + b^{s_i,P_2} + b_{r_j,P_2} + mp_{P_2} + \epsilon_{P_2}. \quad (1)$$

The associated carrier phases, $L_1$ and $L_2$ are given by $$L_1 = \rho + c(dT-dt) + \lambda_1 N_1 - d_{ion,L_1} + d_{trop} + b^{s_i,L_1} + b_{r_j,L_1} + mp_{L_1} + \epsilon_{L_1},$$

$$L_2 = \rho + c(dT-dt) + \lambda_2 N_2 - \gamma d_{ion,L_1} + d_{trop} + b^{s_i,L_2} + b_{r_j,L_2} + mp_{L_2} + \epsilon_{L_2}. \quad (2)$$

Eqns. (1-2) are composed of the following terms: $\rho$ is the geometric range, dT-dt is the clock error differential, $d_{ion,x}$ are the frequency dependent ionosphere delay, $d_{trop}$ is the troposphere delay, $b^{s_i,x}$ are the satellite interfrequency biases, $b_{s_j,x}$ are the receiver interfrequency biases, $mp_x$ are the frequency dependent multipath error and $\epsilon_x$ are the noise terms. Additionally, $\lambda_i$ are the wavelengths of the two frequencies and $$\gamma = \frac{f_1^2}{f_2^2}.$$

The ionosphere combinations, $$P_I = P_2 - P_1 = (\gamma-1)d_{ion,L_1} + \Delta b^{s_i,P} + \Delta b_{r_j,P} + \Delta mp_P + \Delta \epsilon_P,$$

$$L_I = L_1 - L_2 = (\lambda_1 N_1 - \lambda_2 N_2) + (\gamma-1)d_{ion,L_1} - \Delta b^{s_i,L} - \Delta b_{r_j,L} - \Delta mp_L - \Delta \epsilon_L, \quad (3)$$

are dominated by the ionospheric contributions in the domain where the noise and carrier multipath contributions are low.

The $\Delta$'s are, by convention, the 2 minus 1 channels. For connected arcs of data, the ambiguity terms, due to differences in cycles, are constant. Additionally, the multipath on the carrier phase is generally 2 orders of magnitude smaller than those on the pseudorange measurements (Hofmann-Wellenhof [2001]). With these treatments, the equations for $P_I$ and $L_I$ become $$P_I = (\gamma-1)d_{ion,L_1} + \Delta b^{s_i,P} + \Delta b_{r_j,P} + \Delta mp_P + \Delta \epsilon_P,$$

$$L_I = N + (\gamma-1)d_{ion,L_1} - \Delta b^{s_i,L} - \Delta b_{r_j,L} - \Delta \epsilon_L. \quad (4)$$

Solving for $d_{ion,L_1}$ requires the determination of the ambiguity factor and the satellite and receiver differential biases, $\Delta b_{s_j,P}$ and $\Delta b^{r_j,P}$ respectively. These two processes are referred to as phase leveling and satellite and receiver bias estimation. Once $d_{ion,L_1}$ is determined, the total electron content (TEC) is simply a scaling factor of $d_{ion,L_1}$ i.e.

$$d_{ion,L_1} \frac{40.3 \cdot TEC}{f_1^2}. \quad (5)$$

An example of the $P_I$ combination compared to a (leveled) $L_I$ combination for several arcs of data is shown in FIG. 1. It can be seen that the $P_I$ combination contains much larger noise than the $L_I$ combination.

Leveling Methodology

The leveling methodology is designed to use the unbiased level of the $P_I$ code ionospheric observable to set the level of the $L_I$ phase ionospheric observable. This effectively adjusts the leveled $L_I$ combination to provide a low-noise measure of the ionospheric content plus some biases (to be discussed in the next section). To correct the level of the $L_I$ combination, a constant value $\langle N \rangle$ must be determined to characterize the weighted mean of $P_I$-$L_I$, i.e.

$$\langle N \rangle = \frac{\sum_i w_i (P_{I,i} - L_{I,i})}{\sum_i w_i}, \quad (6)$$

where index i is over all measurements in a connected arc. A method of determining the $w_i$ is needed. The leveled $L_I$ combination is then $$\bar{L}_I = L_I + \langle N \rangle. \quad (7)$$

Using eqn. (3), the $P_I$-$L_I$ combination yields $$P_I - L_I = -N + \Delta b^{s_i,L} + \Delta b_{r_j,L} + \Delta b^{s_i,P} + \Delta b_{r_j,P} + \Delta mp_P - \Delta \epsilon_L + \Delta \epsilon_P \quad (8)$$

Since the biases and the ambiguity terms are assumed to be constant over a phase connected arc, the distribution around these constant values is determined by $\Delta mp_P$, and the two noise terms. If one assumes that the noise terms are negligible compared to the multipath, then $P_I$-$L_I$ provides the constant terms needed for the leveling plus additional multipath distribution. The optimal choice of $w_i$ is then determined by the distribution of $\Delta mp_P$.

The COSMIC spacecraft configuration introduces significantly more multipath than ground based GPS stations as shown by Hwang et al. [2010]. As can be seen in the observation equations, Eqn. (4), the pseudorange multipath contribution increases the variance of the $P_I$ combination; the $P_I$ combination is distributed around the ionospheric content by the multipath distribution. Therefore, it is possible to minimize the variance of the $P_I$-$L_I$ combinations using the multipath to develop a weight. Since one may have no a priori knowledge of the distribution of the multipath, the method of maximum entropy (Cover and Thomas [1991]) suggests that only the mean and variance of the multipath should be taken and a normal distribution function should be used as the weighting function. This approach introduces the least amount of self-correlation between the weighted average and the sample of the distribution. Consider now the two multipath combinations (not to be confused with the $mp_x$ terms)

$$MP_1 = P_1 - \frac{a}{d}L_1\lambda_1 + \frac{b}{d}L_2\lambda_2, \quad (9)$$

$$MP_2 = P_2 - \frac{c}{d}L_1\lambda_1 + \frac{a}{d}L_2\lambda_2,$$

where a, b, c and d are frequency dependent combinations, for the given $f_1$ and $f_2$ these are:

$a=9529, b=7200, c=11858, d=2329.$

It was shown in Estey and Meertens [1999] that these combinations can be expressed as $$MP_1 = \bar{\epsilon}_1 - \left(1 + \frac{2}{\lambda-1}\right)n_1\lambda_1 + \quad (10)$$

$$\left(\frac{2}{\lambda-1}\right)n_2\lambda_2 - \left(1 + \frac{2}{\lambda-1}\right)mp_{P_1} + \left(\frac{2}{\lambda-1}\right)mp_{P_2},$$

$$MP_2 = \bar{\epsilon}_2 - \left(\frac{2\lambda}{\lambda-1}\right)n_1\lambda_1 + \left(\frac{2\lambda}{\lambda-1}\right)n_2\lambda_2 -$$

$$\left(\frac{2\lambda}{\lambda-1}\right)mp_{P_1} + \left(\frac{2\lambda}{\lambda-1}\right)mp_{P_2},$$

where $\bar{\epsilon}_i$ are combinations of the carrier multipath, $mp_{L_i}$, and the noise, $\epsilon_{L_i}, \epsilon_{P_i}$.

Therefore the difference $$MP_1 - MP_2 = P_I - \lambda_1 L_1 - \lambda_2 L_2, \quad (11)$$

$$= \Delta \bar{\epsilon} + \Delta mp_P + \lambda_1 N_1 - \lambda_2 N_2.$$

It has also been shown (Hofmann-Wellenhof [2001]) that the noise and carrier phase multipath are two (2) orders of magnitude smaller than the pseudorange multipath. For each connected arc, the ambiguities are constant, so Eqn. 11 is a distribution of the differential pseudo range multipath. This distribution may be used to derive the Gaussian statistics of the weighting function for the width of the differential multipath contribution to be used during the weighting. This implies that points in the arc that have large deviation from the mean of the differential multipath contribution will not have a large influence on the calculation of $\langle N \rangle$. This is what is desired to help reduce the variance in the weighted $P_I$-$L_I$ calculation. The weighting function is then the normal distribution of the difference in the multipath combinations with mean and variance $$\mu = \frac{1}{N}\sum_{i=1}^{n} MP_{1,i} - MP_{2,i}, \quad \sigma^2 = \frac{1}{N}\sum_{i=1}^{N}(MP_{1,i} - MP_{2,i} - \mu)^2. \quad (12)$$

The $w_i$ for each measurement is calculated as $$w_i = \frac{1}{\sqrt{2\pi\sigma^2}}\exp\left\{-\frac{(MP_{1,i} - MP_{2,i} - \mu)^2}{2\sigma^2}\right\}. \quad (13)$$

Using this one finds:

$$\langle N \rangle = -N + \Delta b^{si}{}_{,L} + b_{r_j,L} + b^{si,P} + b_{r_j,P} + \langle \Delta mp_P \rangle_{\mu,\sigma^2} -$$
$$\langle \Delta \epsilon_L \rangle_{\mu,\sigma^2} - \langle \Delta \epsilon_P \rangle_{\mu,\sigma^2}, \quad (14)$$

where $\langle . \rangle_{\mu,\sigma^2}$ represents the weighted average of • using the weighting function described in Eqn. 6 with weights defined by Eqn. 13. Thus $$\bar{L}_I = (\gamma-1)d_{ion,L} + \Delta b^{si,P} + \Delta b_{r_j,P} + \langle \Delta mp_P \rangle_{\mu,\sigma^2} +$$
$$\langle \Delta \epsilon_L \rangle_{\mu,\sigma^2} + \langle \Delta \epsilon_P \rangle_{\mu,\sigma^2} - \Delta \epsilon_L. \quad (15)$$

This can be converted to slant TEC (STEC) by $$\sum_s = \frac{40.3 \cdot TEC}{f_1^2} \frac{\bar{L}_I}{\gamma-1} - B_{ij} + \Delta\sum_s, \quad (16)$$

where $$B_{ij} =$$

$$\frac{40.3 \cdot TEC}{f_1^2} \frac{\Delta b^{si,P} + \Delta b_{r_j,P} + \langle \Delta mp_P \rangle_{\mu,\sigma^2} + \langle \Delta \epsilon_L + \Delta \epsilon_P \rangle_{\mu,\sigma^2}}{\gamma-1},$$

$$\Delta\sum_s = \frac{40.3 \cdot TEC}{f_1^2} \frac{\Delta \epsilon_L}{\gamma-1}$$

The determination of B, which is dominated by the satellite and station differential biases, is discussed in the following section.

Bias Estimation

One of the features of the GIM data processing system is the ability to estimate the satellite and receiver differential biases, $B_{ij}$, from Eqn. 16 by taking cross correlations between many different ground based GPS measurements. Each ground station has multiple satellite links which allow an algorithm to be developed for determining the bias between station i and receiver j in a relative sense. By fixing one of the relative satellite biases to be 0, the complete deconvolution of $\Delta b^{si,P}$ and $\Delta b_{r_j,P}$, is performed. This, of course, is done under the assumption that for some weighting function, g one can assume:

$$\langle \Delta mp_P \rangle_g = 0, \langle \Delta \epsilon_L + \Delta \epsilon_P \rangle_g = 0$$

where the subscript g indicates a weighted mean using g as the weighting function.

For an unbiased distribution, g, this is true for an unbiased noise (e.g. $\Delta_{\epsilon L}$). For the ground GPS receivers, it is also safe to assume that the multipath is small, thus the weighted mean of zero is also a fair assumption. Another assumption that leads to the same conclusion is that the global average multipath over all satellites and receivers is zero. Under these assumptions, for weighting function g, GIM provides $$\tilde{B}_{i,j,g} = \frac{40.3 TEC}{f_1^2} \frac{\Delta \tilde{b}^{si,P} + \Delta \tilde{b}_{r_j,P} + \langle \Delta mp_P \rangle_g}{\gamma-1}, \quad (17)$$

where the $\tilde{b}$ represents the relative bias where each has been shifted in opposite directions by some constant value (this is the absolute bias of the GPS satellite fixed to 0).

For the space-platform, such as COSMIC, GIM is not suitable to estimate receiver biases. Instead, one can use the relative satellite biases produced by GIM and generate a relative COSMIC receiver bias. Thus one effectively computes:

$$\tilde{B}_{r_j} = B_{ij} - \frac{40.3 \cdot TEC}{f_1^2} \frac{\Delta \tilde{b}^{s_i,P}}{1-\gamma} \quad (18)$$

$$= \frac{40.3 \cdot TEC}{f_1^2} \frac{\Delta \tilde{b}_{r_j,P} + \langle \Delta mp_P \rangle_{\mu,\sigma^2}}{\gamma - 1}$$

Unfortunately, the multipath in the COSMIC environment is larger than the ground case. As a result, one cannot make the same assumption about the unbiased distribution and therefore, cannot neglect the weighted mean. This will differ from arc to arc and introduces larger variances in the bias estimation for space-borne GPS data.

The GIM bias estimation relies on cross correlation between multiple sites measuring the same ionosphere. For the space-based GPS data, this data overlap is not available and an alternate method must be employed. One could use a background model, such as the International Reference Ionosphere (IRI) (Bilitza and Reinisch [2008]) but these models are not able to capture the space weather conditions that may be present.

Instead, embodiments of the invention employ a simple but effective approach. Since COSMIC is orbiting at around 800 km, above the F-region peak, one expects upward looking measurements to be passing through a minimal amount of the ionosphere. If the measurements are restricted to be in the high latitude regions, the contribution from the plasmasphere is expected to be very small. Under the assumption that the high-latitude and high elevation angle measurements pass through a minimal amount of TEC, these measurements can be used to derive a bias for the receiver. This is done by tabulating the smallest measurement of an arc that passes through the filtered region. Over the course of the day the measurements are averaged. From this average a small component due to the small ionosphere and plasmasphere contributions are subtracted. This average minus estimated contribution is the daily bias for the receiver.

Figure 2:
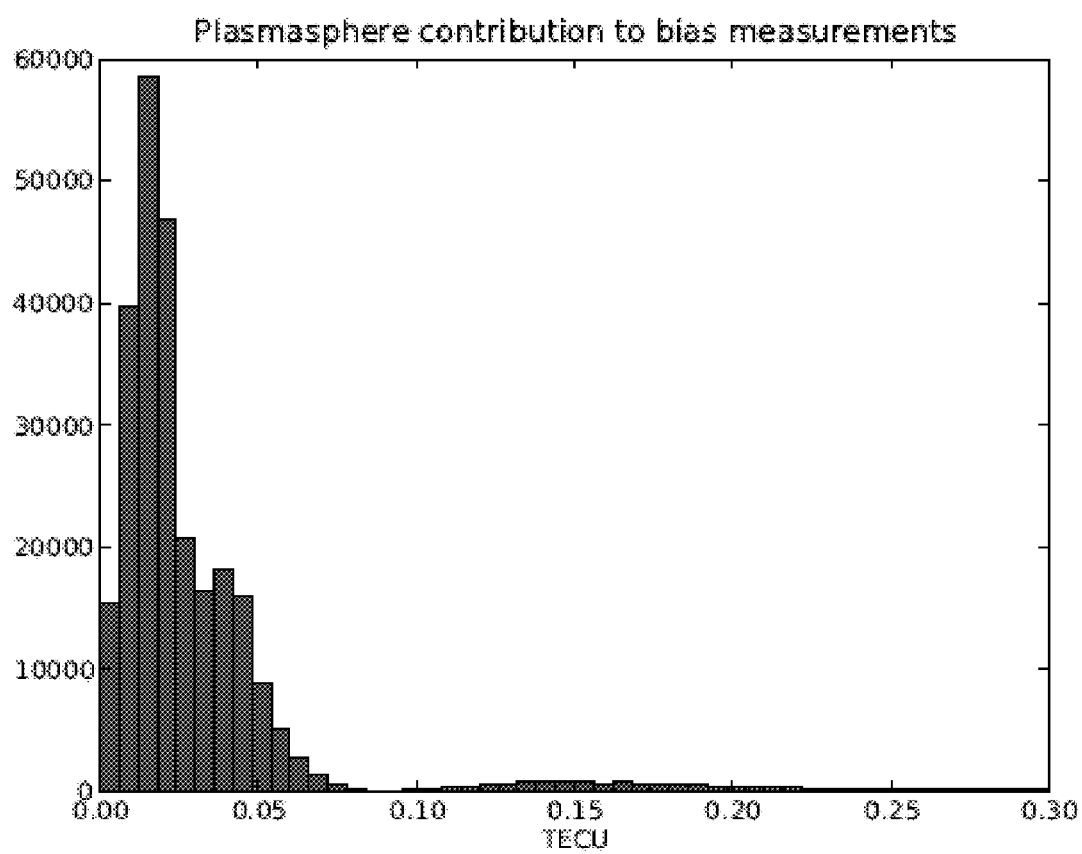
FIG. 2 shows a histogram of the total plasmasphere contribution for all COSMIC measurements that were upward looking (>70°) and above 60 degrees latitude for all 6 COSMIC satellites between Jan. 1, 2009 and Mar. 31, 2009 in accordance with one or more embodiments of the invention.

A recent study by Yizengaw et al. [2008] showed that the plasmasphere contribution to the total ground based TEC in high latitude regions was about 25%. FIG. 2 shows a histogram of the total plasmasphere contribution for all COSMIC measurements that were upward looking (>70°) and above 60 degrees latitude for all 6 COSMIC satellites between Jan. 1, 2009 and Mar. 31, 2009. The plasmasphere contribution was computed by integrating the line-of-sight TEC through the Sheeley-Tu (Sheeley et al. [2001]; Tu et al. [2006]) plasmasphere model. The total contribution appears to be at the 0.1 TECU level.

Figure 3:
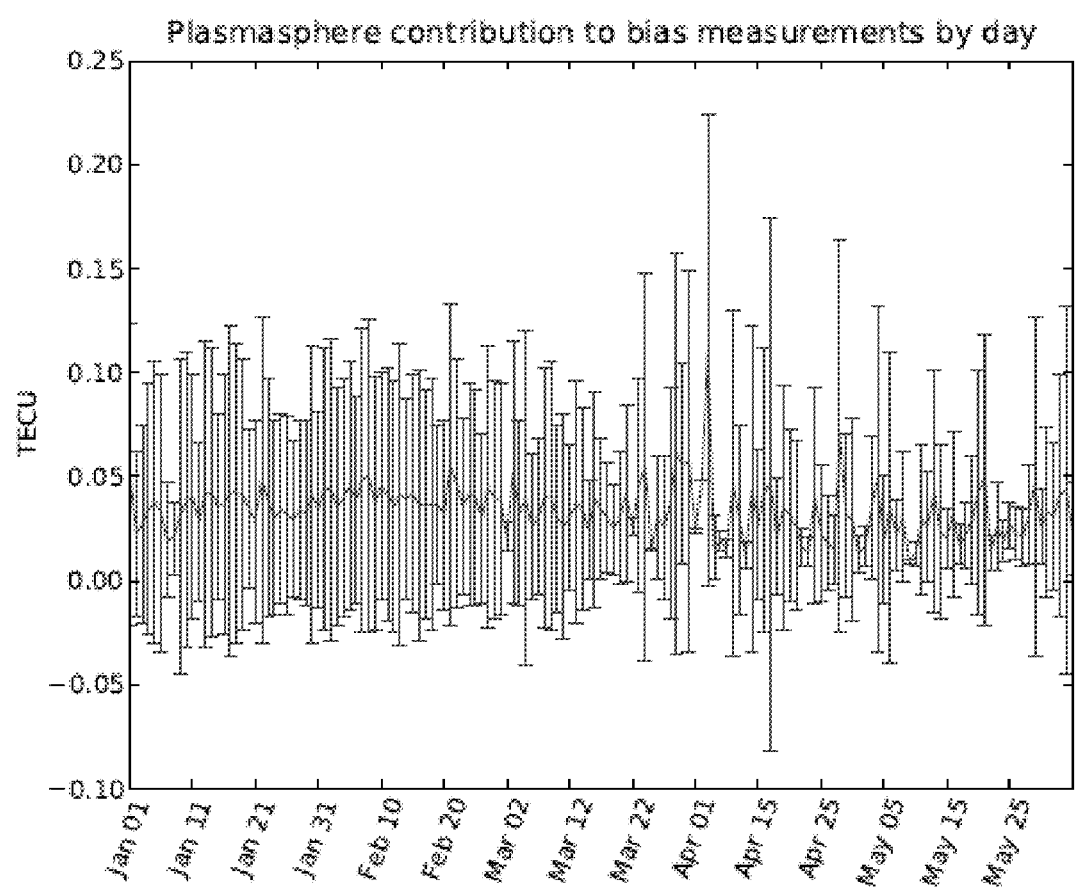
FIG. 3 illustrates the daily variations of the plasmasphere contributions in accordance with one or more embodiments of the invention.

FIG. 3 illustrates the daily variations of the plasmasphere contributions. The lines represent the means of the plasmasphere contribution and the error bars represent the 1-sigma range of the plasmasphere contributions. Thus, it can be seen from FIG. 3 that the daily variation of the mean is minimal and the 1-sigma variation each day is similarly of order 0.1 TECU. In a simplistic model, it may be assumed that the background TEC between COSMIC and the GPS satellite in the upward looking, high-latitude measurements, is 0.5 TECU, with errors of order 0.1 TECU. This estimate is likely to be slightly large by a few tenths of TECU and is intended to compensate for the fact that there is a double bulge in FIG. 2 in which the plasmasphere is sometimes larger by 50% or more.

Applying this process, a daily estimate of the receiver bias, $\tilde{B}_{r_j}$ can be computed. To eliminate potential data errors and variabilities, the actual bias used is a 10-day running average of the daily estimates. It is also not unlikely to have entire days which do not meet the filtering criterion. For these missing days, the global bias average (for all days) is used in place of the daily estimate in the 10-day average.

Figure 4:
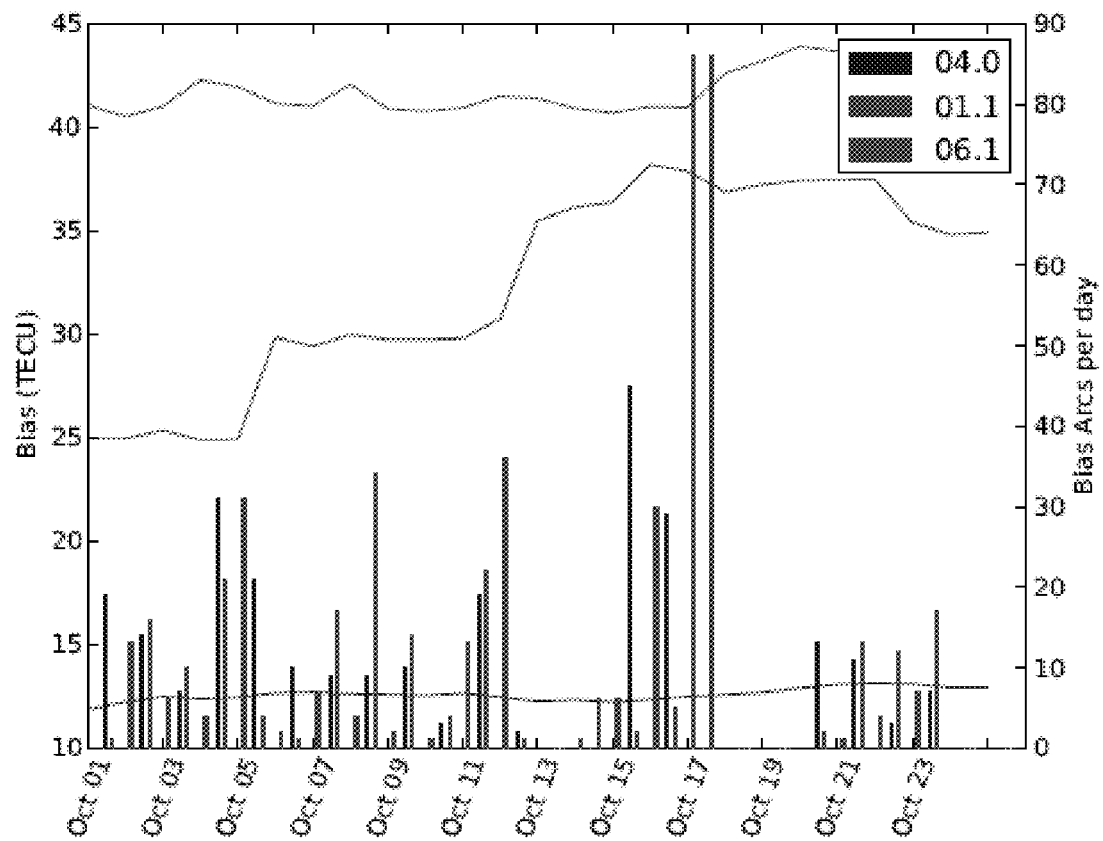
FIG. 4 shows the 10-day average biases for three of the COSMIC satellites between Oct. 1, 2010 and Oct. 24, 2010 in accordance with one or more embodiments of the invention.

FIG. 4 shows the 10-day average biases for three of the COSMIC satellites between Oct. 1, 2010 and Oct. 24, 2010. More specifically, FIG. 4 illustrates the daily variation of the bias estimates for antenna 0 of COSMIC satellite number 4 (04.0), antenna 1 of COSMIC 1 (01.1) and antenna 1 of COSMIC 6 (06.1). The right axis shows the number of data arcs available each day for the bias estimate. The histogram of FIG. 4 shows the number of arcs of data that satisfy the filtering criteria. The variabilities for satellite 4 and 6 appear to be of the order of 1 TECU but the estimated value seems to be stable. Satellite 1 shows a bimodal behavior. This is suspected of being due to a real discrete change in the hardware bias.

Discussion

Figure 5:
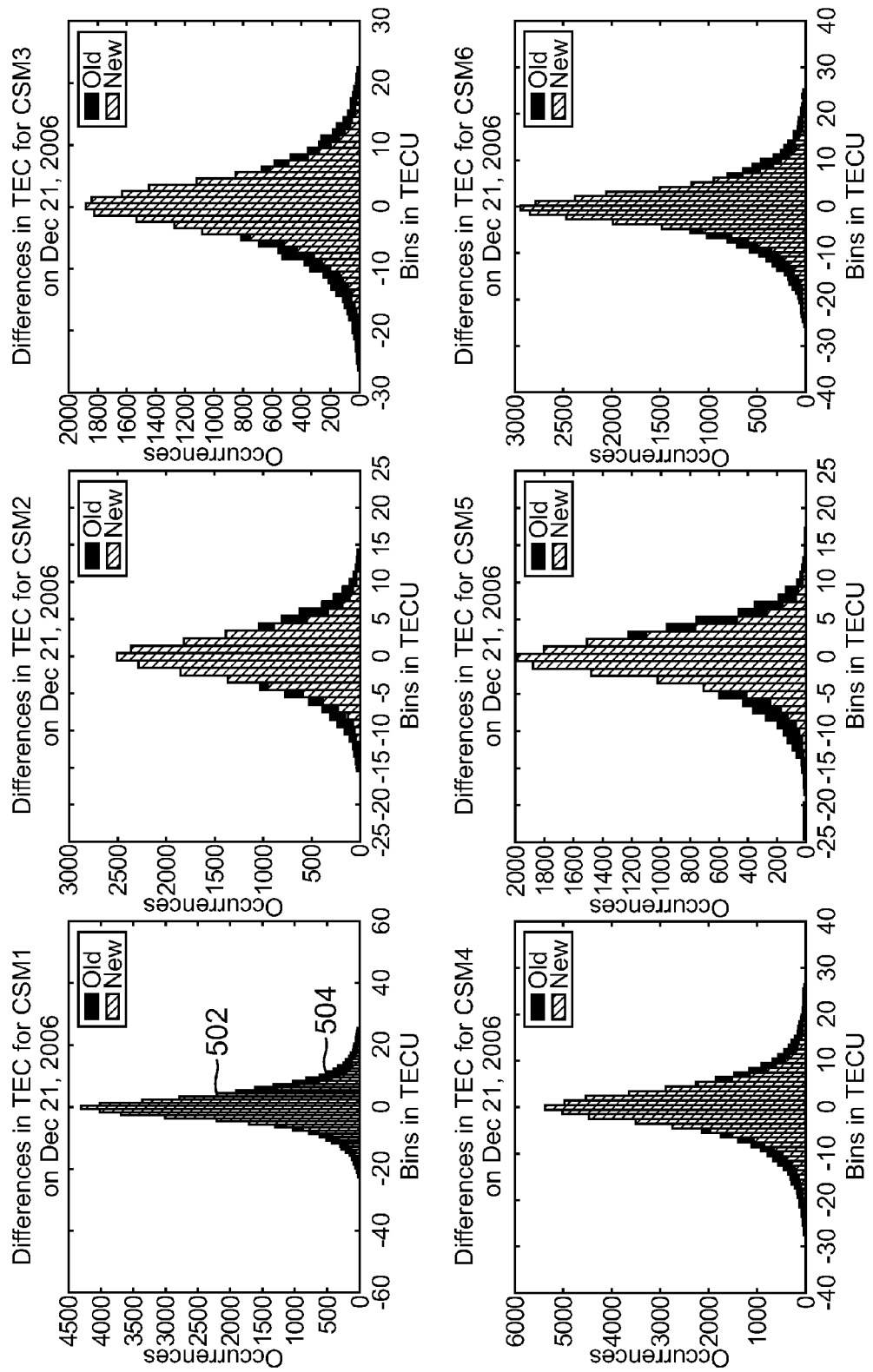
FIG. 5 illustrates histograms of the difference between $P_I$ and $L_I$ using a new multipath weighted leveling scheme 502 and the old elevation angle weighted leveling scheme 504 for Dec. 21, 2006 in accordance with one or more embodiments of the invention.

The improved performance of the multipath weighted leveling can be seen in FIG. 5. Thus, FIG. 5 illustrates histograms of the difference between $P_I$ and $L_I$ using a new multipath weighted leveling scheme 502 and the old elevation angle weighted leveling scheme 504 for Dec. 21, 2006 in accordance with one or more embodiments of the invention. In other words, FIG. 5 shows the histograms of $P_I$-$L_I$ after leveling is applied for the data from Dec. 21, 2006. The new histogram 502 is the new multipath weighted leveling. The old histogram 504 indicates the elevation weighted leveling used in GIM for ground-based GPS data. From the width of the histograms, the new weighting technique 502 levels the $\overline{L}_I$ combination consistently closer to the $P_I$ combination than does the elevation angle weighted approach. This is as expected, as the new leveling weights are designed to minimize the variance of this distribution. Table 1 below tabulates the RMS difference for each panel of FIG. 5.

TABLE 1

| COSMIC | MULTIPLATH BASED | ELEVATION ANGLE BASED |
|--------|------------------|----------------------|
| 1 | 6.1 TECU | 6.8 TECU |
| 2 | 4.0 TECU | 4.4 TECU |
| 3 | 6.4 TECU | 7.1 TECU |
| 4 | 6.5 TECU | 7.3 TECU |
| 5 | 4.2 TECU | 4.8 TECU |
| 6 | 6.5 TECU | 7.2 TECU |

As shown, Table 1 illustrates a consistent improvement of about 0.5 TECU or more across all satellites.

Figure 6:
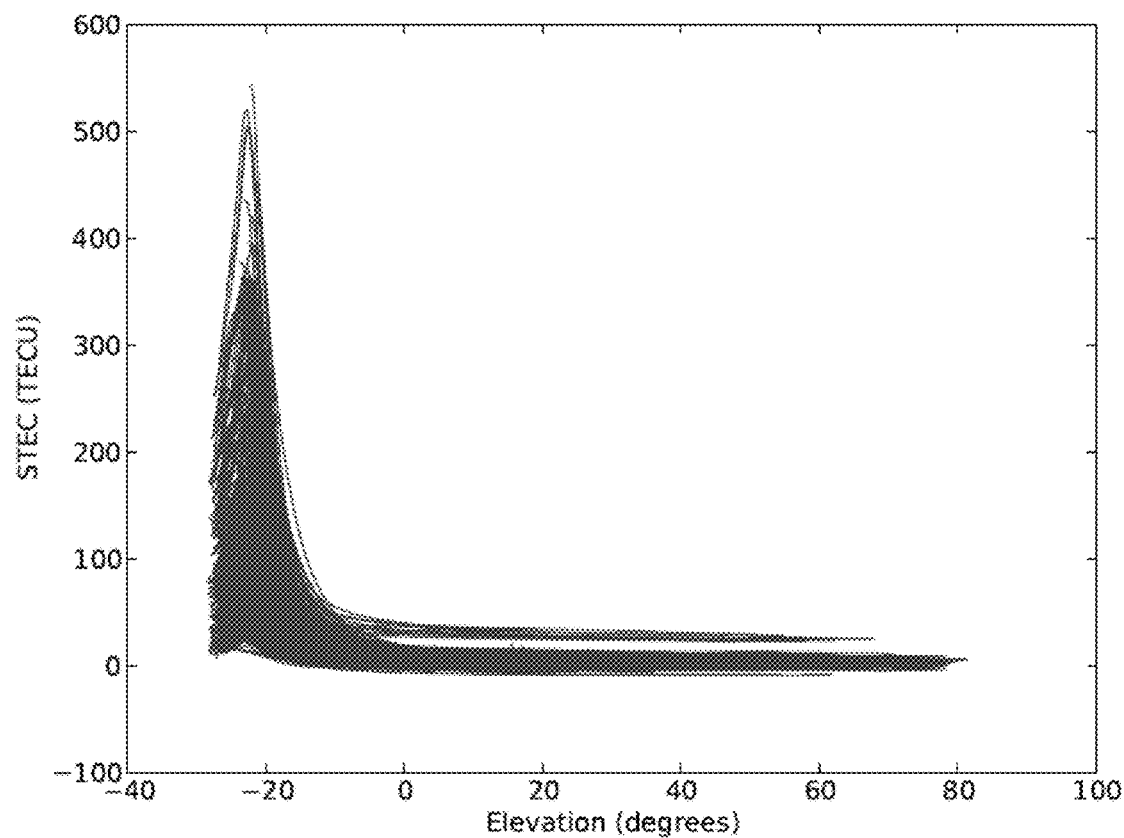
FIG. 6 shows the leveled and unbiased data from COSMIC 1 on Oct. 22, 2010 in accordance with one or more embodiments of the invention.

The final result of the leveling/bias removal procedure is shown in FIG. 6. FIG. 6 shows the leveled and unbiased data from COSMIC 1 on Oct. 22, 2010. This figure contains all of the connected phase arcs for one day. The tight structure shows the leveling algorithm is consistent from arc to arc. The approach of the slant TECU measurement to zero as elevation angle increases shows the biases are also being appropriately computed.

One may consider the total error of these slant TECU measurement derived from COSMIC GPS signals. Hwang et al. [2010] have shown that the multipath error for COSMIC is of the order of a few cm. Using an upper limit of 4 cm, this is equivalent to 0.4 TECU. From experience with both ground and space based data, the systematic error of the leveling algorithm may be approximated to be 2 TECU. Adding this error to the bias error of 0.5 TECU, the total error of these slant TECU measurements are estimated to be 2.1 TECU.

Hardware Environment

Figure 7:
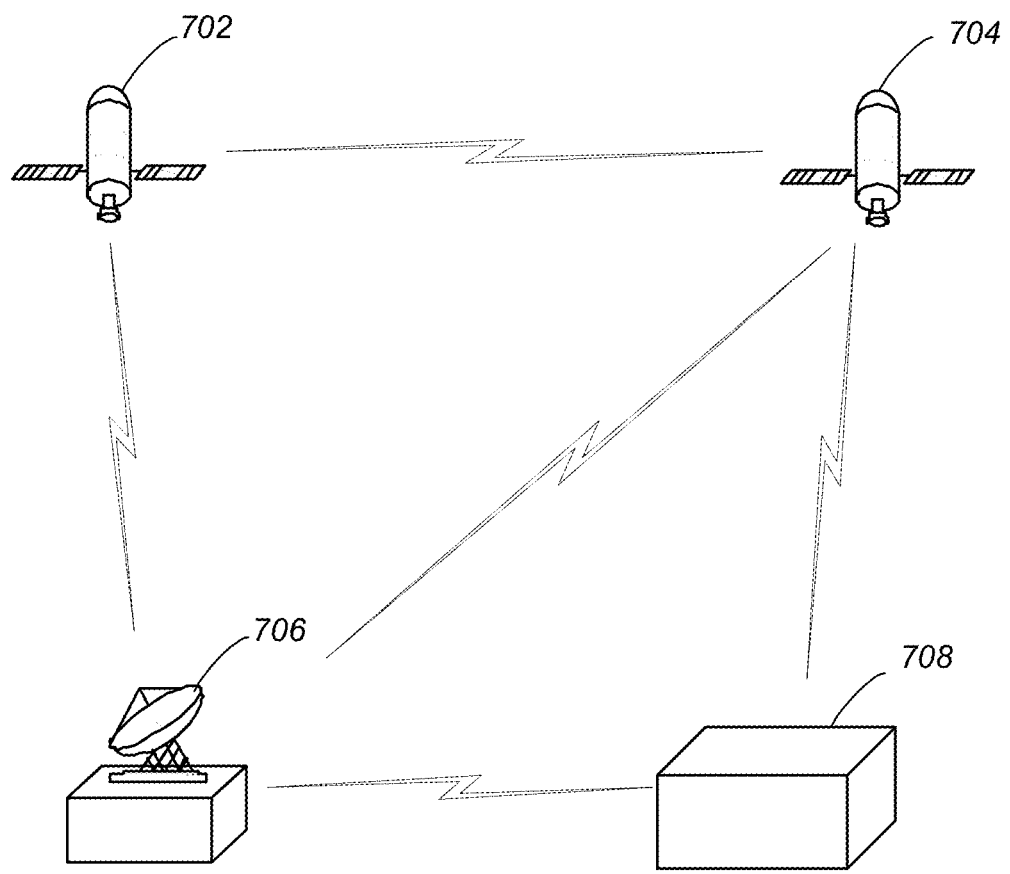
FIG. 7 illustrates a hardware system utilized in accordance with one or more embodiments of the invention.

FIG. 7 illustrates a hardware system utilized in accordance with one or more embodiments of the invention. Satellite 702 represents the constellation of four or more satellites (or fewer satellites in certain situations) configured to transmit time and positioning information necessary to determine a location of a receiver.

Space-borne receiver 704 and ground based receiver 706 are both configured to receive the information transmitted from satellite constellation 702 and use such information to determine a location. Ground based receiver 706 and/or processor 708 may also receive such information from space-borne receiver 704. Processor/computer 708 is configured to further process the signals from ground based receiver 706 and space-borne receiver 704 as described above. More specifically, processor 708 is configured to combine the GPS observations from receivers 704 and 706 and use the combination as a backbone for a modeling system that is used to estimate the global 3D electron density field.

Processor 708 may be a computer having general and/or special purpose hardware processors and a memory (e.g., random access memory [RAM]). Such a processor may be coupled to, and/or integrated with, other devices, including input/output (I/O) devices such as a keyboard, a cursor control device (e.g., a mouse, a pointing device, pen and tablet, touch screen, multi-touch device, etc.) and a printer.

Output/results from processor 708 may be presented on a display (that may be integrated into/with processor/computer 708) or provided to another device for presentation or further processing or action. In one embodiment, such a display comprises a liquid crystal display (LCD) having a plurality of separately addressable liquid crystals. Alternatively, the display may comprise a light emitting diode (LED) display having clusters of red, green and blue diodes driven together to form full-color pixels. Each liquid crystal or pixel of the display changes to an opaque or translucent state to form a part of the image on the display in response to the data or information generated by the processor from the application of the instructions of a computer program and/or operating system to the input and commands.

The processor/computer 708 may also optionally comprise an external communication device such as a modem, satellite link, Ethernet card, or other device for accepting input from, and providing output to, other processors/computers 708. Processor 708 may be configured to execute a computer program/instructions stored in memory or permanent storage that cause the processor 708 to perform the steps necessary to implement and/or use the present invention or to load the program of instructions into a memory, thus creating a special purpose data structure causing the processor/computer 708 to operate as a specially programmed computer executing the method steps described herein. Such a computer program may also be tangibly embodied in memory and/or a data communications devices, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the processor/computer 708. Generally, the components described herein all comprise logic and/or data that is embodied in/or retrievable from a tangible (e.g., non-transient) device, medium, signal, or carrier, e.g., a non-transient data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Logical Flow

Figure 8:
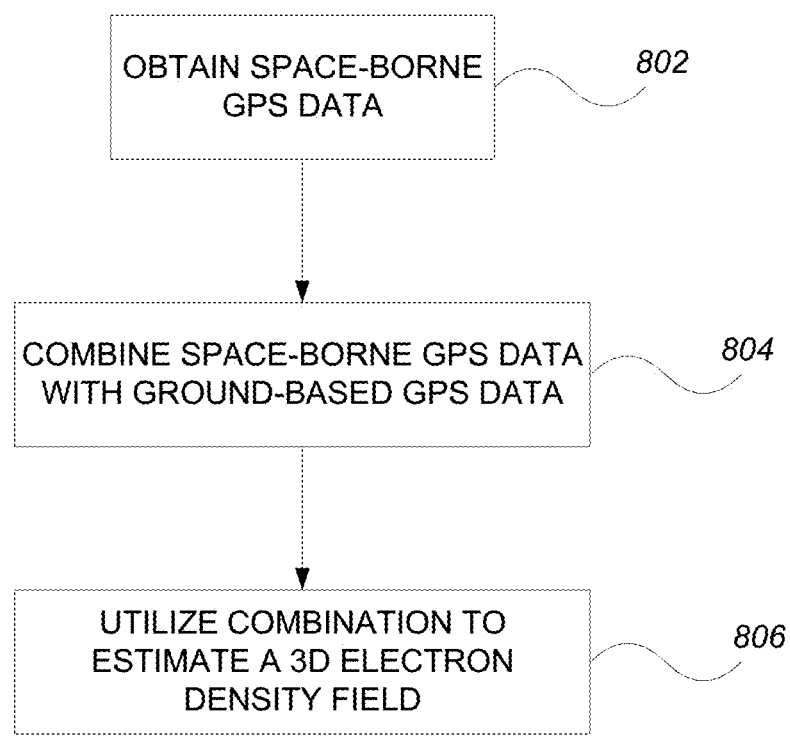
FIG. 8 is a flow chart illustrating the logical flow for estimating ionospheric observables using space-borne observations in accordance with one or more embodiments of the invention.

FIG. 8 is a flow chart illustrating the logical flow for estimating ionospheric observables using space-borne observations in accordance with one or more embodiments of the invention.

At step 802, space borne GPS data of ionospheric delay is obtained from a satellite. Such space-borne GPS data is obtained via COSMIC.

At step 804, the space borne GPS data is combined with ground-based GPS observations.

At step 806, the combination is utilized in a model to estimate a global 3D electron density field. Such utilizing may include phase leveling the space borne GPS data. Further, the phase leveling may utilize an unbiased level of pseudorange code ionospheric observable to set a level of a carrier phase ionospheric observable. The utilizing step may also estimate bias of a satellite and a receiver (e.g., by taking cross correlations between multiple different ground based GPS measurements). The bias estimation may further tabulate the smallest measurement of an arc that passes through a filtered region of the ionosphere, average the smallest measurements over a course of a day, and subtract from the average a component for/representing the ionosphere and plasmasphere contributes (e.g., to determine a daily bias for the receiver). The actual bias for the receiver may consist of a 10-day running average of the daily biases.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, embodiments of the invention provide a new processing system for COSMIC data. This new system uses the information in the multipath combination to provide a TEC level based on variance reduction of the $P_I$-$\overline{L}_I$ combination. This level is more accurate than an alternate weighting scheme, i.e. the elevation based weighting scheme used by GIM. Using the correctly leveled phase connected arcs from COSMIC, a relative receiver differential bias can be estimated. The process of leveling and bias estimation has an error of order 2.1 TECU.

With a processing system in place, it is now possible to systematically assimilate COSMIC GPS measurements into a model such as JPL/USC GAIM. Such at tool can be utilized to systematically include COSMIC measurements on a daily basis. It has been shown that such inclusion leads to improved profile structures and better global data coverage.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

Bilitza, D., and B. W. Reinisch (2008), International Reference Ionosphere 2007. Improvements and new parameters, Advances in Space Research, 42, 599-609, doi: 10.1016/J.ASR.2007.07.048;

Cover, T. M., and J. A. Thomas (1991), Elements of Information Theory, Wiley Series in Telecommunications, Wiley-Interscience Publication;

Estey, L. H., and C. M. Meertens (1999), Teqc: The multipurpose toolkit for gps/glonass data, GPS Solutions, 3, 42-49, 10.1007/PL00012778;

Hajj, G. A., and L. J. Romans (1998), Ionospheric electron density profiles obtained with the Global Positioning System: Results from the GPS/MET experiment, Radio Science, 33, 175-190, doi:1O.1029/97RSO3183;

Hajj, G. A., B. D. Wilson, C. Wang, X. Pi, and I. G. Rosen (2004)) Data assimilation of ground GPS total electron content into a physics-based ionospheric model by use of the Kalman filter, Radio Science, 39, 1, dsi: 10.1029/2002RS002859;

Hernandez-Pajares, M., J. Juan, J. Sanz, R. Orus, A. Garcia-Rigo, J. Feltens, A. Komjathy, S. Schaer, and A. Krankowski (2008)) The igs vtec maps: A reliable source of ionospheric information since 1998, Journal of Geodesy;

Hofmann-Wellenhof, B. (2001), GPS: Theory & Practice, Springer;

Hwang, C., T.-P. Tseng, T.-J. Lin, D.~vehlaU. Hugentobler, and B. Chao (2010)) Quality assessment of formosat-3/cosmic and grace gps observables: analysis of multipath, ionospheric delay and phase residual in orbit determination, GPS Solutions, 14, 121-131, 10.1007/~10291-009-0145-0;

Jakowski, N., and C. M. Wilken (2006), Space weather monitoring by gps measurements on board champ, Space Weather, 5 (S08006);

Komjathy, A., B. Wilson, X. Pi, V. Akopian, M. Dumett, B. Iijima, O. Verkhoglyadova, and A. J. Mannucci (2010)) JPL/USC GAIM: On the impact of using cosmic and ground-based gps measurements to estimate ionospheric parameters, J. Geophys. Res., 11 5 (A02307);

Mandrake, L., B. Wilson, C. Wang, G. Hajj, A. Mannucci, and X. Pi (2005)) A performance evaluation of the operational jet propulsion laboratory/university of southern california global assimilation ionospheric model (jpl/usc gaim), J. Geophys. Res., 110 (A12306);

Mannucci, A. J., B. D. Wilson, D. N. Yuan, C. H. Ho, U. J. Lindqwister, and T. F. Runge (1998), A global mapping technique for GPS-derived ionospheric total electron content measurements, Radio Science, 33, 565-582, doi: 1O.1029/97RSO2707;

Pi, X., A. J. Mannucci, B. A. Iijima, B. D. Wilson, A. Komjathy, T. F. Runge, and V. Akopian (2009), Assimilative modeling of ionospheric disturbances with formosat-3/cosmic and ground-based gps measurements, Terr., Atmos., and Ocean. Sci., 20 (I), 273-285;

Sheeley, B. W., M. B. Moldwin, H. K. Rassoul, and R. R. Anderson (2001)) An empirical plasmasphere and trough density model: CRRES observations, Journal of Geophysical Research, 106, 25,631-25,642, doi: 10.1029/2000JA000286;

Syndergaard, S., E. R. Kursinski, B. M. Herman, E. M. Lane, and D. E. Flittner (2005), A refractive index mapping operator for variational assimilation of occultation data, Mon. Weather Rev., 133(9), 2650-2668;

Tu, J., P. Song, B. W. Reinisch, J. L. Green, and X. Huang (2006), Empirical specification of field-aligned plasma density profiles for plasmasphere refilling, Journal of Geophysical Research (Space Physics), 11 1, 6216, doi: 10.1029/2005JA011582; and Yizengaw, E., M. B. Moldwin, D. Galvan, B. A. Iijima, A. Komjathy, and A. J. Mannucci (2008), Global plasmaspheric TEC and its relative contribution to GPS TEC, Journal of Atmospheric and Solar-Terrestrial Physics, 70, 1541-1548, doi: 10.1016/j.jastp.2008.04.022.

What is claimed is:

1. A method for estimating ionospheric observables using space-borne observations, comprising:
   obtaining space-borne global positioning system (GPS) data of ionospheric delay from a space-borne satellite receiver;
   obtaining ground-based GPS observations;
   combining the space-borne GPS data with the ground-based GPS observations; and
   utilizing the combination in a model to estimate a global three-dimensional (3D) electron density field.

2. The method of claim 1, wherein the space-borne GPS data is obtained via the Constellation Observing System for Meteorology, Ionosphere and Climate (COSMIC).

3. The method of claim 1, wherein the utilizing comprises phase leveling the space-borne GPS data.

4. The method of claim 3, wherein the phase leveling comprises utilizing an unbiased level of a pseudorange code ionospheric observable to set a level of a carrier phase ionospheric observable.

5. The method of claim 1, wherein the utilizing comprises estimating a bias of the space-borne satellite receiver and a second receiver.

6. The method of claim 5, wherein the bias is estimated by taking cross correlations between multiple different ground based GPS measurements.

7. The method of claim 5, wherein the estimating the bias for the second receiver comprises:
   tabulating a smallest refraction of an arc that passes through a filtered region of the ionosphere;
   averaging the smallest measurements over a course of a day; and
   subtracting, from the average, a component for the ionosphere and plasmasphere contributions, to determine a daily bias for the second receiver.

8. The method of claim 7, wherein the bias for the second receiver comprises a 10-day running average of the daily biases.

9. A system for estimating ionospheric observables using space-borne observations comprising:
   (a) a processor having a memory;
   (b) an application executing on the processor, wherein the application is configured to:
      (1) obtain space-borne global positioning system (GPS) data of ionospheric delay from a space-borne satellite receiver;
      (2) obtain ground-based GPS observations;
      (3) combine the space-borne GPS data with the ground-based GPS observations; and
      (4) utilize the combination in a model to estimate a global three-dimensional (3D) electron density field.

10. The system of claim 9, wherein the space-borne GPS data is obtained via the Constellation Observing System for Meteorology, Ionosphere and Climate (COSMIC).

11. The system of claim 9, wherein the utilizing comprises phase leveling the space-borne GPS data.

12. The system of claim 11, wherein the phase leveling comprises utilizing an unbiased level of a pseudorange code ionospheric observable to set a level of a carrier phase ionospheric observable.

13. The system of claim 9, wherein the utilizing comprises estimating a bias of the space-borne satellite receiver and a second receiver.

14. The system of claim 13, wherein the bias is estimated by taking cross correlations between multiple different ground based GPS measurements.

15. The system of claim 13, wherein the estimating the bias for the second receiver comprises:
   tabulating a smallest measurement of an arc that passes through a filtered region of the ionosphere;
   averaging the smallest measurements over a course of a day; and
   subtracting, from the average, a component for the ionosphere and plasmasphere contributions, to determine a daily bias for the second receiver.

16. The system of claim 15, wherein the bias for the second receiver comprises a 10-day running average of the daily biases.

* * * * *